(12) United States Patent
Foltz

(10) Patent No.: US 6,554,150 B2
(45) Date of Patent: Apr. 29, 2003

(54) CONTAMINANT COVER FOR TANK FILLER NECK CLOSURE ASSEMBLY

(75) Inventor: Dean C. Foltz, Shelbyville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 35 days.

(21) Appl. No.: 09/964,235

(22) Filed: Sep. 26, 2001

(65) Prior Publication Data

US 2002/0021017 A1 Feb. 21, 2002

Related U.S. Application Data

(63) Continuation of application No. 09/402,683, filed as application No. PCT/US98/07147 on Apr. 8, 1998.
(60) Provisional application No. 60/042,713, filed on Apr. 8, 1997.

(51) Int. Cl.[7] .......................... B65D 43/16; B65D 43/24; B65D 51/18
(52) U.S. Cl. .................. 220/86.2; 220/255; 220/259.1; 220/829; 220/843
(58) Field of Search .............................. 220/86.2, 255, 220/259, 829, 843, 562, 254, DIG. 33, 582, 256, 810, 826, 827, 848, 849, 203.23, 203.28, 203.29, 203.24

(56) References Cited

U.S. PATENT DOCUMENTS

| | | | | |
|---|---|---|---|---|
| 1,978,314 A | * | 10/1934 | Lancaster | 220/86.1 |
| 2,054,145 A | * | 9/1936 | Tandy | 280/834 |
| 3,750,825 A | * | 8/1973 | Bachie | 220/324 |
| 4,498,600 A | * | 2/1985 | Blion | 220/225 |
| 4,527,825 A | * | 7/1985 | Clouse | 296/97.22 |
| 5,165,749 A | * | 11/1992 | Sheppard | 296/97.22 |
| 5,234,122 A | * | 8/1993 | Cherng | 220/211 |
| 5,437,491 A | * | 8/1995 | Nedbal et al. | 296/97.22 |
| 5,462,190 A | * | 10/1995 | Lienhart et al. | 220/375 |
| 5,580,258 A | * | 12/1996 | Wakata | 439/142 |

* cited by examiner

Primary Examiner—Stephen K. Cronin
Assistant Examiner—Niki M. Eloshway
(74) Attorney, Agent, or Firm—Barnes & Thornburg (57) ABSTRACT

A filler neck closure assembly (30) includes a closure apparatus (32) formed to include a pump nozzle-receiving opening (36) and adapted to be mounted on an open mouth of a filler neck 24. A cover 40, pivotally mounted to the closure apparatus (32), is movable between a first position covering the nozzle-receiving opening (36) to seal the filler neck (24) and a second position uncovering the nozzle-receiving opening (36) to allow access thereto. An over-center leaf spring (42) normally biases the cover (40) toward its first closed position. A tether (94) coupled to the cover (40) has its other end (96) coupled to a filler neck access door (90) so that as the access door (90) is moved from a closed position blocking access to the filler neck (24) to an open position unblocking access to the filler neck (24), the cover (40) is moved from the first position covering the nozzle-receiving opening (36) to the second position uncovering the nozzle-receiving opening (36).

32 Claims, 11 Drawing Sheets

FIG. 18

CONTAMINANT COVER FOR TANK FILLER NECK CLOSURE ASSEMBLY

CROSS-REFERENCES TO RELATED APPLICATIONS

This application is a continuation of U.S. application Ser. No. 09/402,683, filed Oct. 8, 1999. U.S. application Ser. No. 09/402,683 is a U.S. national stage application of international application PCT/US98/07147, filed Apr. 8, 1998, which claims priority to U.S. Provisional Application No. 60/042,713, filed Apr. 8, 1997.

BACKGROUND AND SUMMARY OF THE INVENTION

The present invention generally relates to a filler neck closure assembly for a vehicle fuel tank, and particularly to a containment cover for closing a capless fuel tank filler neck. More particularly, the present invention relates to a closure assembly suitable for use with a robotic refueling system.

A removable fuel cap with a sealing gasket is typically used to close the open end of a fuel tank filler neck. It has been observed that fuel caps are often lost or damaged over time and, as a result, the open end of the filler neck might not be closed and sealed in accordance with the original equipment specifications during operation of the vehicle.

A robotic refueling system operates to detect a vehicle arriving at a vehicle-refueling station, open the vehicle fuel tank filler neck access door, locate a fuel tank filler neck in the vehicle, insert a fuel-dispensing nozzle automatically into the filler neck to introduce fuel in the fuel tank of the vehicle, withdraw the fuel dispensing nozzle after refueling and close the filler neck access door, all without any intervention by an attendant. The filler neck closure assembly of the present invention is particularly suited for use with such robotic refueling systems.

According to the present invention, a filler neck closure assembly is provided for a vehicle fuel tank filler neck. The filler neck closure assembly includes a closure apparatus formed to include a pump nozzle-receiving opening and adapted to be mounted on an open mouth of a filler neck. A cover, coupled to the closure apparatus, is movable between a closed position covering the nozzle-receiving opening to close the filler neck and an opened position uncovering the nozzle-receiving opening to allow access thereto. The cover is coupled to a tether that, when moved away from the filler neck and away from the closure apparatus, moves the cover from the closed position to the opened position.

In preferred embodiments, the closure apparatus includes an outer shell formed to include the nozzle-receiving opening and a conduit coupled to the outer shell to communicate with the nozzle-receiving opening and adapted to be coupled to a vehicle fuel tank filler neck. The closure apparatus further includes a sealable closure in the conduit that is normally closed to block discharge of fuel vapor from the filler neck to the atmosphere through the nozzle-receiving opening and that can be moved to an opened position by a fuel-dispensing nozzle during an initial stage of refueling. The cover is arranged to engage the outer shell and lie in spaced-apart relation to the sealable closure when the cover lies in the closed position.

Also in preferred embodiments, the cover is spring-loaded to "snap" to its closed or opened position. The closure apparatus includes an overcenter spring configured to bias the cover toward the closed position when the cover is positioned to lie between the closed position and a transition position between the closed and opened positions. The overcenter spring is also configured to bias the cover toward the opened position when the cover is positioned to lie between the transition position and the opened position.

The tether has its other end coupled to an inner wall of a pivotable filler neck access door mounted in the body panel of a vehicle. When the access door is opened by a vehicle owner, service station attendant, or robotic refueling system during a first stage of vehicle refueling, the filler neck cover is moved to the opened position uncovering the nozzle-receiving opening. A fuel-dispensing pump nozzle can then be inserted manually or robotically into the nozzle-receiving opening in the filler neck to open the sealable closure in the conduit and to dispense fuel into the filler neck for delivery to the fuel tank of the vehicle.

Additional features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
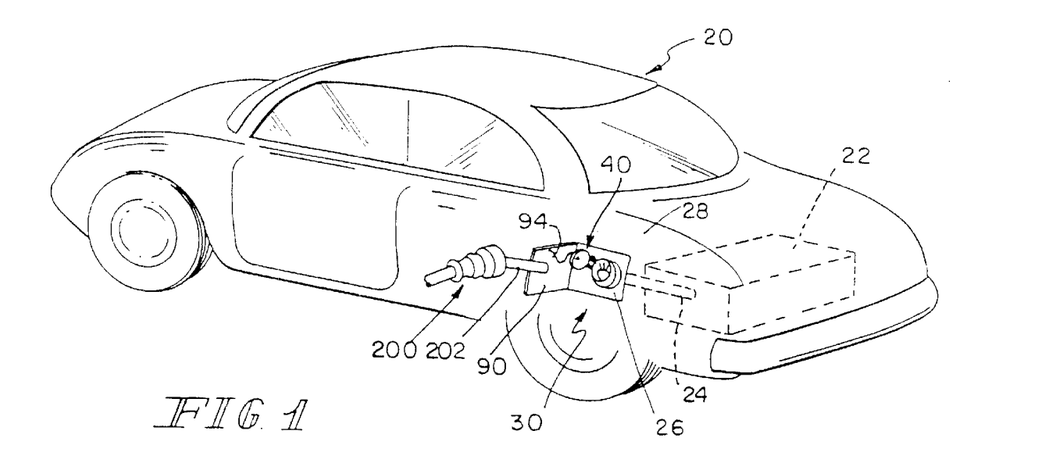
FIG. 1 is a perspective view of a vehicle showing an outer filler neck access door moved to an opened position relative to a vehicle body panel to expose a filler neck closure assembly and showing a fuel-dispensing pump nozzle arranged for insertion into a filler neck through the filler neck closure assembly to dispense fuel into a filler neck (shown in phantom) coupled to a fuel tank (shown in phantom) of the vehicle.
Figure 2:
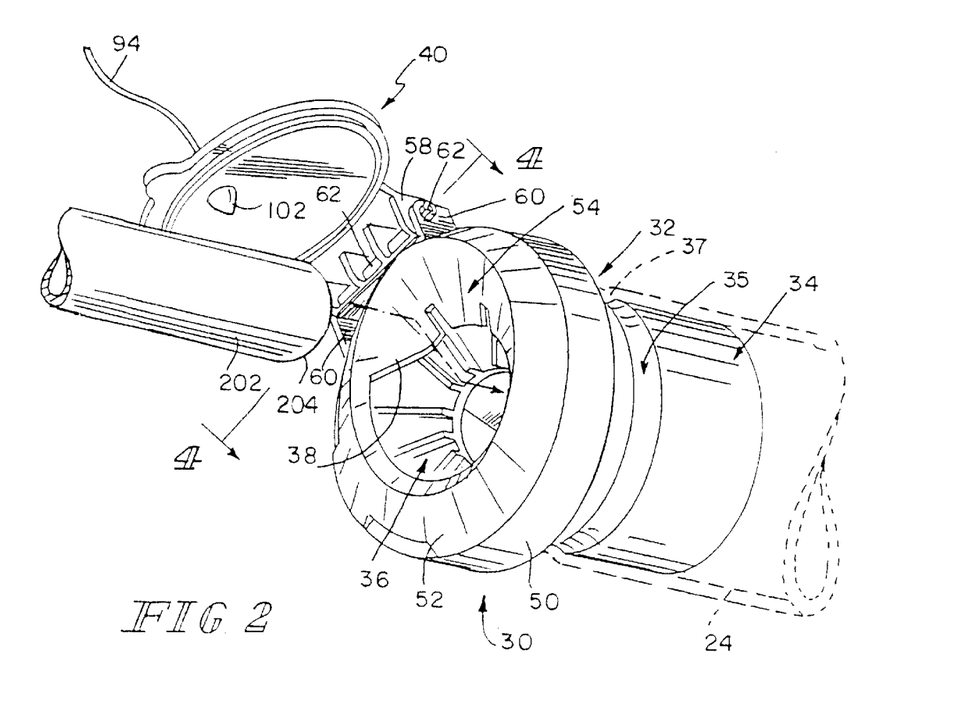
FIG. 2 is an enlarged perspective view of the filler neck closure assembly of FIG. 1 showing a closure apparatus including an outer shell configured to form a nozzle-guiding surface defining a nozzle-receiving opening and showing a tethered cover arranged to lie in an opened position away from the nozzle-receiving opening in the outer shell to allow the pump nozzle to be inserted through the nozzle-receiving opening into a conduit coupled to the outer shell and adapted to be coupled to the filler neck (shown in phantom)

As shown in FIGS. 1 and 2, a vehicle 20 includes a fuel tank 22, a filler neck 24 extending from the fuel tank, and an opening 26 in the side wall 28 of the vehicle for providing access to a filler neck closure assembly 30. The closure assembly 30 includes an outer shell 32 mounted on a base 34 coupled to the open mouth of filler neck 24. In preferred embodiments, base 34 is substantially cylindrical and is formed to include a circumferential groove 35 that receives a radially inwardly extending annular bead 37 formed in filler neck 24 to couple closure assembly 30 to filler neck 24. However, it is within the scope of the invention as presently perceived for closure assembly 30 and filler neck 24 to have other structures or apparatus, such as, for example, threads, cams, or flanges, that mate to couple closure assembly 30 to filler neck 24.

A robotic refueling system 200 includes a pump nozzle 202 adapted for insertion into a nozzle-receiving opening 36 formed in outer shell 32, so that fuel can be pumped into fuel tank 22 through filler neck 24. Outer shell 32 has an inner, funnel-shaped nozzle-guiding surface 38 formed to define nozzle-receiving opening 36. Nozzle-guiding surface 38 facilitates insertion of nozzle 202 into filler neck 24 for refueling. Reference is made to a PCT Patent Application filed on Feb. 11, 1998 (designating U.S.), Serial No. PCT/US 98/02876, incorporated by reference herein, for a more detailed description of a robotic refueling system of this type.

Figure 3:
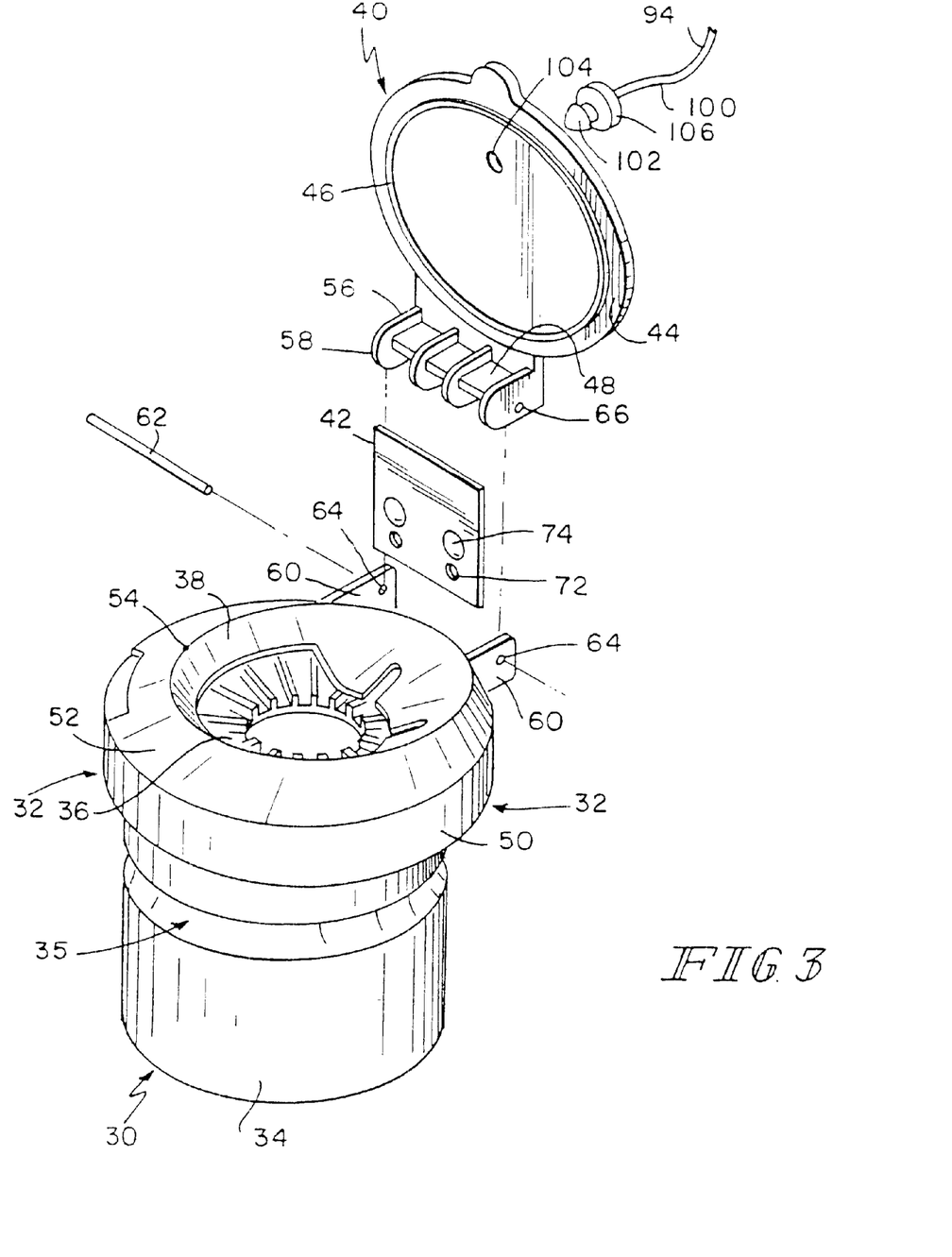
FIG. 3 is an exploded perspective view of the filler neck closure assembly of FIG. 2 showing the outer shell, the conduit coupled to the outer shell, the cover, an overcenter leaf spring for biasing the cover, and a tether for connecting to the cover.
Figures 8, 9:
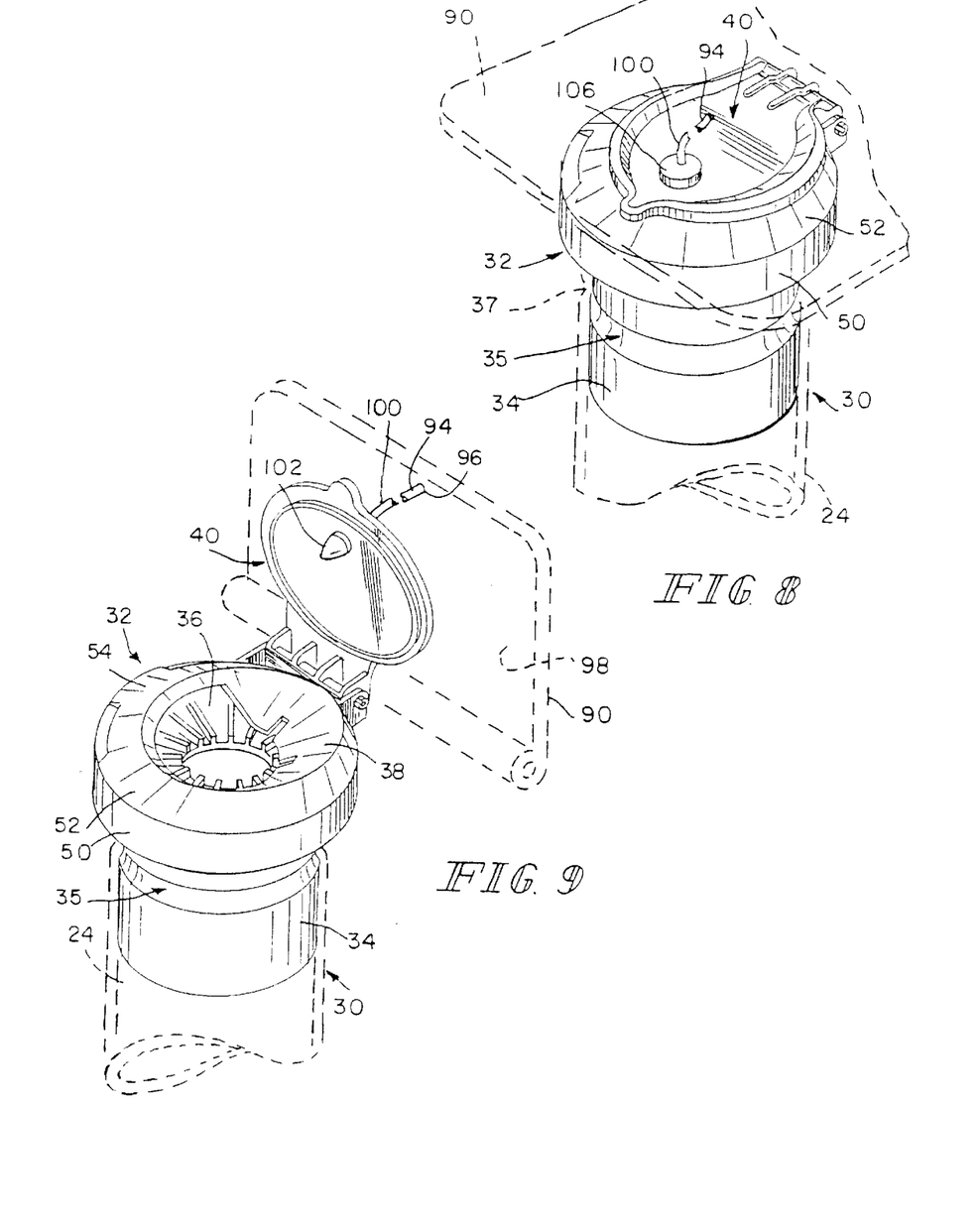
FIG. 8 is a perspective view of the filler neck closure assembly of FIG. 2 showing the cover in the closed position, the outer access door (shown in phantom) of the vehicle overlying the cover and also lying in a closed position, and a tether extending from the cover toward the access door.
FIG. 9 is a perspective view of the filler neck closure assembly similar to FIG. 8 showing the access door (shown in phantom) after it has been moved to an opened position and showing the tethered cover positioned to lie in the opened position uncovering the nozzle-receiving opening formed in the outer shell to allow insertion of the fuel-dispensing pump nozzle into the filler neck through the nozzle-receiving opening.
Figure 10:
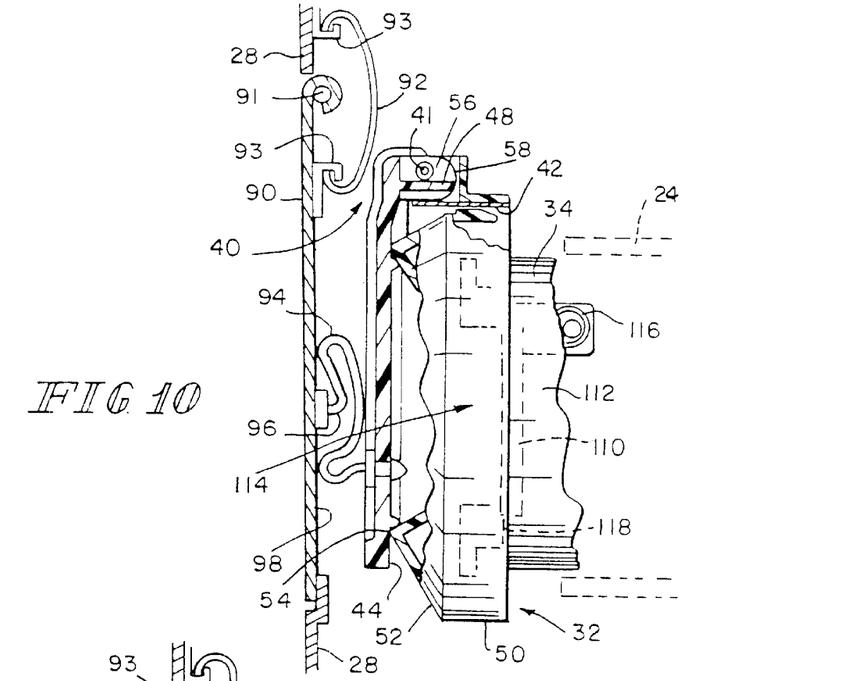
FIG. 10 is a top plan view of the closure assembly of FIGS. 1–3 and 8–9, with portions broken away, showing the access door in a closed position blocking access to the filler neck, the cover also in the closed position blocking access to the nozzle-receiving opening, and the tether in a slack configuration lying between the cover and the access door.
Figures 12, 12A:
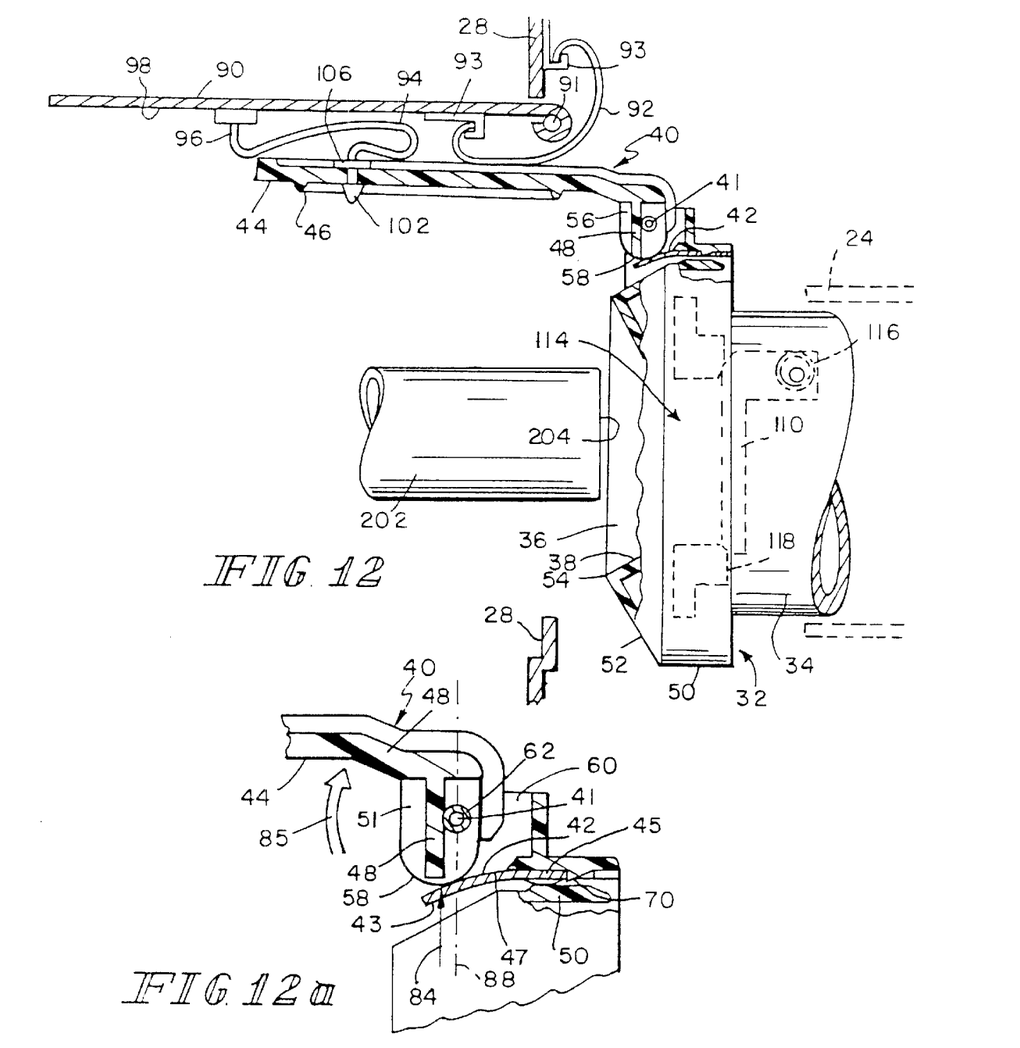
FIG. 12 is a top plan view of the closure assembly similar to FIG. 11 showing the access door in an opened position allowing access to the filler neck, the cover in the opened position allowing insertion of the fuel-dispensing pump nozzle into the filler neck through the nozzle-receiving opening, and the tether in a slack condition lying between the cover and the access door.
FIG. 12a is an enlarged sectional view of a portion of the closure assembly of FIG. 12 showing the overcenter spring biasing the cover toward the open position thereof.

A cover 40 is pivotally mounted to outer shell 32 for motion between a closed position covering nozzle-receiving opening 36 (as shown in FIGS. 8 and 10) and an opened position uncovering nozzle-receiving opening 36 (as shown in FIGS. 9 and 12). As shown in FIG. 3, an overcenter leaf spring 42 in the form of a rectangular plate is secured to outer shell 32 to normally bias cover 40 toward the closed position. Cover 40 includes a circular seating portion 44, an annular rim portion 46 extending from the circular seating portion 44, and an offset hinge portion 48. Outer shell 32 has a cylindrical side wall 50, a sloping front wall 52, and a ridge-like seating surface 54 connecting front wall 52 with funnel-shaped nozzle-guiding surface 38. When cover 40 is arranged to lie in the closed position, leaf spring 42 urges seating portion 44 of cover 40 into engagement with seating surface 54 of outer shell 32, with rim portion 46 of cover 40 arranged to lie inside seating surface 54 of outer shell 32. Leaf spring 42 is sufficiently stiff to ensure a tight seal between cover 40 and outer shell 32 to prevent dust from entering nozzle-receiving opening 36. Seating portion 44 of the cover 40 may be provided with a resilient foam pad (not shown) made, for example, from neoprene material) to provide a more secure sealing between cover 40 and outer shell 32.

The mounting of cover 40 to outer shell 32 will now be described in more detail in conjunction with FIG. 3. The hinge portion 48 of cover 40 has a plurality of perpendicularly disposed arms 56 having arcuate cam surfaces 58 adapted for engagement with leaf spring 42, which-leaf spring 42 is secured to side wall 50 of outer shell 32 in the manner described below. Side wall 50 of outer shell 32 is provided with a pair of spaced-apart tabs 60 outwardly extending therefrom for receiving arms 56 of cover 40. A pin 62 is inserted through apertures 64 formed in the spaced-apart tabs 60 of outer shell 32 and through apertures 66 formed in arms 56 of cover 40 for pivotally mounting cover 40 to outer shell 32, with the leaf spring 42 engaging the cam surfaces 58 normally to bias cover 40 toward the closed position.

Figure 4:
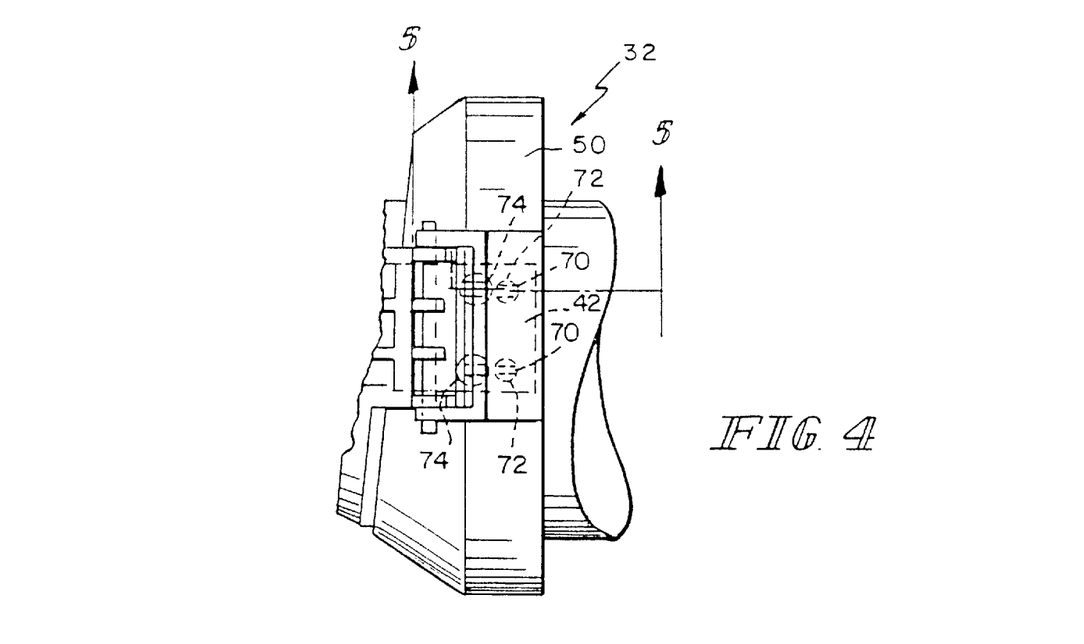
FIG. 4 is a side view of the filler neck closure assembly, taken along line 4—4 of FIG. 2, with a portion broken away, showing the cover coupled to tabs appended to the outer shell and showing the leaf spring (in phantom) arranged to bias the cover into a closed position.
Figure 5:
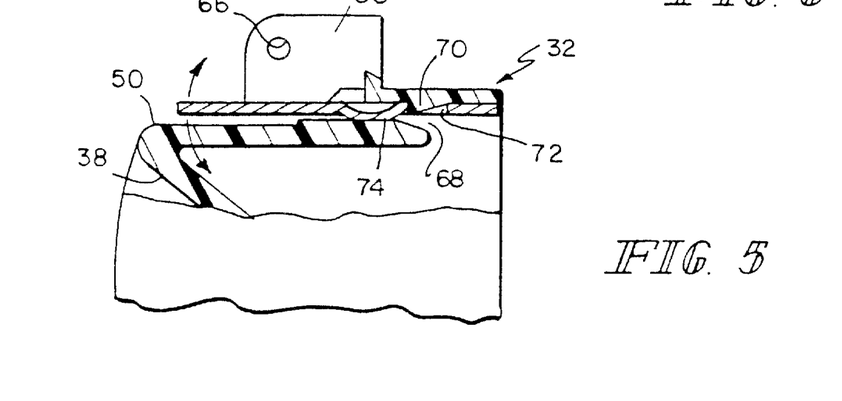
FIG. 5 is a sectional side view of the filler neck closure assembly, taken along the line 5—5 in FIG. 4, showing the overcenter spring fully inserted into the slot in the outer shell, and further showing the overcenter spring being captured in place by a pair of molded-in posts disposed on the interior wa of the slot.
Figure 6:
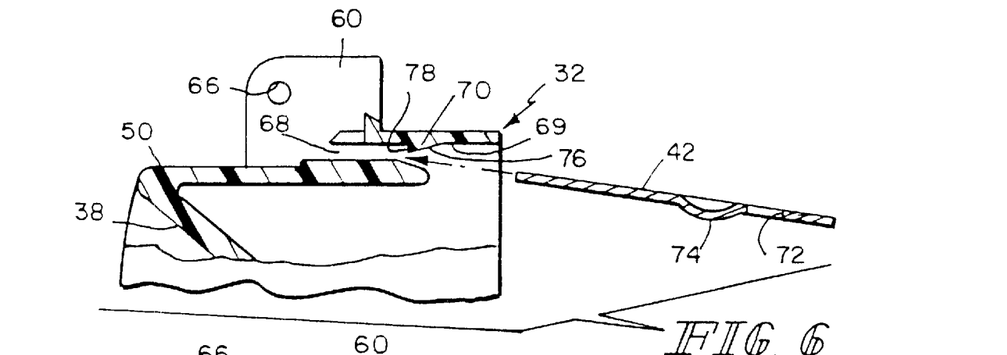
FIG. 6 is a sectional side view of the filler neck closure assembly of FIG. 4 showing the insertion of the overcenter leaf spring into a slot in the outer shell.
Figure 7:
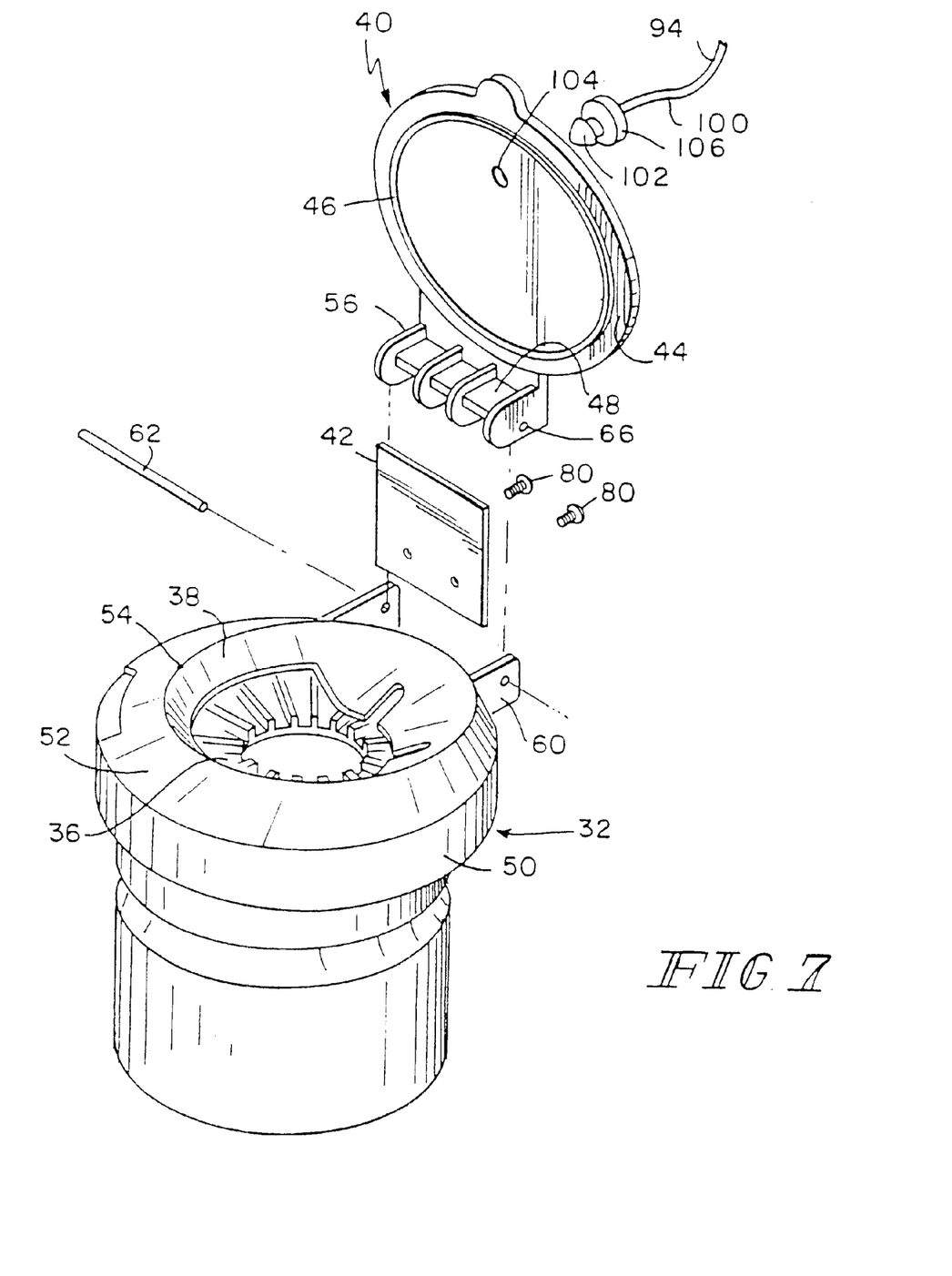
FIG. 7 is an exploded isometric view showing an alternative embodiment filler neck closure assembly including an outer shell, a pair of tabs appended to the outer shell, a cover, a pin for pivotably coupling the cover to the tabs, a leaf spring formed to include a pair of apertures, and a pair of screws arranged for insertion through respective apertures into threaded engagement with the outer shell to mount the leaf spring to the outer shell between the tabs.

The mounting of overcenter leaf spring 42 to outer shell 32 will next be described in more detail with reference to FIGS. 4–6. Side wall 50 of outer shell 32 is provided with a rectangular slot 68 into which leaf spring 42 is inserted. The rectangular slot 68 is dimensioned to ensure a tight seating of leaf spring 42 therein. An interior wall 69 which defines slot 68 has a pair of molded-in posts 70 arranged for reception in the respective apertures 72 in leaf spring 42 when leaf spring 42 is inserted into slot 68. Leaf spring 42 is formed to include a pair of bumps 74 sized to take up the clearance between the walls of leaf spring 42 and the interior walls of the slot 68. The molded-in posts 70 have ramp portions 76 to facilitate insertion of leaf spring 42 into slot 68 and perpendicularly disposed edge portions 78 that snap into apertures 72 in leaf spring 42 to secure leaf spring 42 to outer shell 32. Although leaf spring 42 is secured to outer shell 32 in the particular manner described above, it will be seen from FIG. 7 that other suitable securing means, such as screws 80, can easily be substituted therefor and are within the scope of the invention.

An outer appearance or access door 90 is pivotally mounted to the side wall 28 of vehicle 20 (as shown in FIGS. 10 through 14) for motion between closed and opened positions, respectively, blocking access to the filler neck access opening 26 (as shown in FIGS. 8 and 10) and allowing access to the filler neck access opening for refueling (as shown in FIGS. 9 and 12). An overcenter spring 92 (shown in FIGS. 10 through 14) extending between bosses 93 biases access door 90 toward the closed position if the access door 90 is positioned to lie between the closed position and an intermediate (or transition) position and toward the opened position if access door 90 is positioned to lie between the intermediate position and the second opened position. As can be seen in FIGS. 10 through 14, an axis of rotation 91 of access door 90 is disposed in parallel and spaced-apart relationship with respect to an axis of rotation 41 of cover 40. However, it is within the scope of the invention as presently perceived for axis 41 to be somewhat non-parallel with axis 91.

Cover 40 and access door 90 are coupled to each other by a tether 94 of a suitable length and made from a flexible material. One end 96 of the tether 94 is fastened securely to the inside wall 98 of access door 90. As can be seen more clearly in FIG. 3, the other end 100 of tether 94 has an enlarged, frustoconical portion 102 that is passed through an opening 104 formed in cover 40 to secure tether 94 to cover 40 in a "releasable" manner. Tether 94 has a disc-shaped further portion 106 adjacent to frustoconical portion 102 to close opening 104 in cover 40 when frustoconical portion 102 is inserted therein to prevent dust from entering into the nozzle-receiving opening 36.

As shown diagrammatically in FIGS. 10 through 14, the base 34 of the closure assembly 30 further includes a flapper door 110 pivotally mounted in an interior region 112 thereof in fluid communication with nozzle-receiving opening 36. Flapper door 110 is mounted for motion between first and second positions respectively closing and opening a nozzle-receiving aperture 114 disposed in the interior region 112 of the closure assembly 30. A torsion spring 116 biases the flapper door 110 toward the first position, thereby urging flapper door 110 against a seating surface 118 of the base 34 defining nozzle-receiving aperture 112. As can be seen from the drawings, the seating surfaces 54 and 118, respectively, for cover 40 and flapper door 110 are spaced apart and disposed in substantially opposite directions. When the pump nozzle 202 is inserted into filler neck 24 through closure assembly 30, tip 204 of the pump nozzle 202 engages flapper door 110 to displace it to the second position thereof against the bias of the torsion spring 116. The flapper door 110 serves to prevent dust from entering the filler neck 24 and to prevent fuel vapor or fuel from escaping into the atmosphere. The afore-mentioned PCT Patent Application, Serial No. PCT/US 98/02876 illustratively describes a flapper door of this type and is incorporated herein by reference.

The operation of closure assembly 30 will now be described in more detail in conjunction with FIGS. 10 through 14. As shown in FIG. 10, when cover 40 and access door 90 are in the closed position, tether 94 is slack. By allowing tether 94 to be slack, the independent movement of cover 40 is allowed with respect to access door 90. This, in turn, allows cover 40 to remain shut if access door 90 vibrates or moves relative to cover 40 as vehicle 20 travels down, for example, a bumpy road. In addition, having cover 40 spaced apart from access door 90 prevents noise between access door 90 and cover 40 that would otherwise occur while vehicle 20 is driven.

Figure 11:
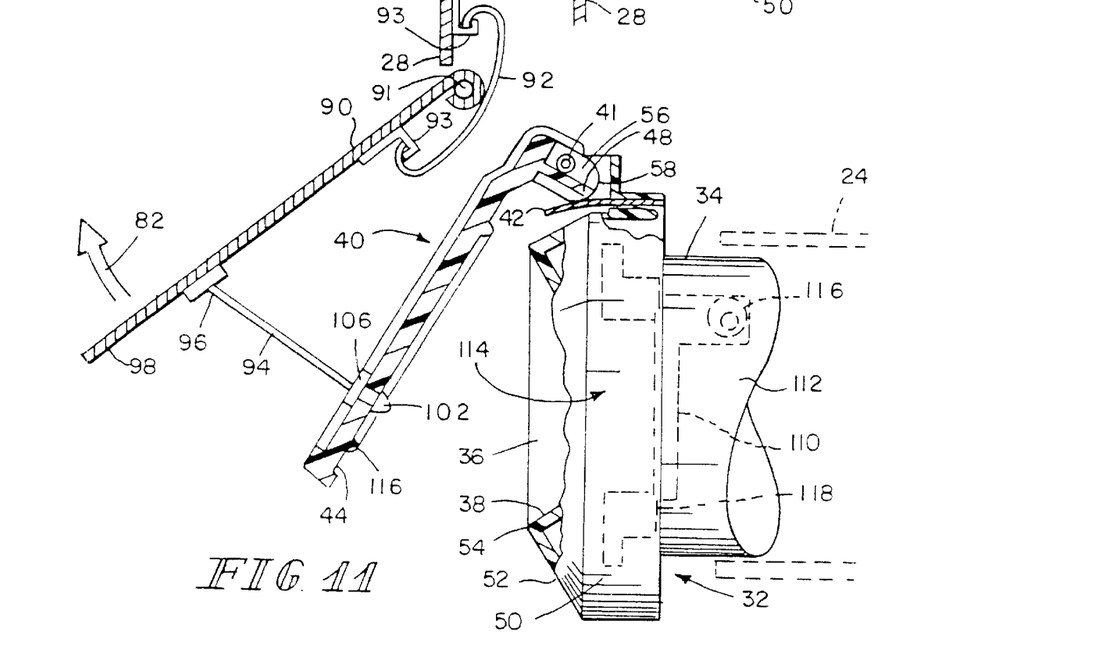
FIG. 11 is a top plan view of the closure assembly similar to FIG. 10 showing the access door and the cover in a partly opened position and the tether in a taut condition lying between the cover and the access door.

As shown in FIG. 11, when access door 90 is opened in direction 82 against the bias of overcenter spring 92, tether 94 becomes taut and forces cover 40 to open against a biasing force produced by leaf spring 42. As access door 90 continues opening in direction 82, leaf spring 42 resists opening so that tether 94 remains taut. This resistance continues until cover 40 and access door 90 reach "a transition" position. When cover 40 and access door 90 are moved beyond the transition position, leaf spring 42, in engagement with cam surfaces 58 (as shown in FIG. 12a), and the overcenter spring 92 respectively force cover 40 and access door 90 to spring into a fully opened position, as shown in FIG. 12. At this point, tether 94 is once again slack.

Figure 13:
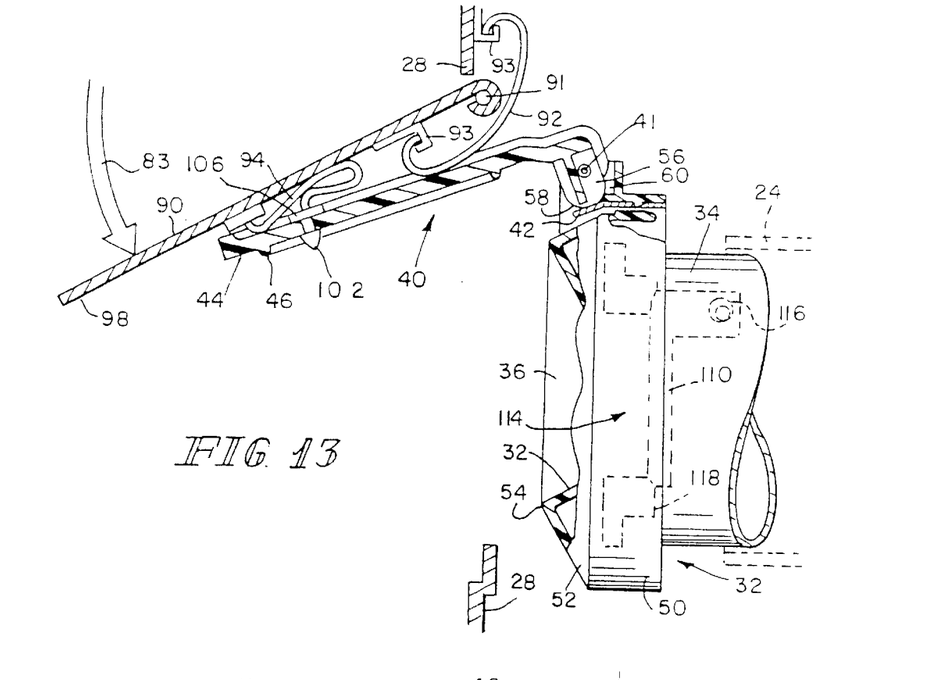
FIG. 13 is a top plan view of the closure assembly similar to FIG. 12 showing the access door being moved from the opened position to a first partly closed position, the tether in a slack condition lying between the cover and the access door, and the cover being urged toward the opened position by the leaf spring to resist movement of the access door to its closed position.

When access door 90 is closed in direction 83, it engages cover 40 and pushes cover 40 to close in direction 83 against the bias of leaf spring 42 as shown in FIG. 13. When cover 40 is beyond the transition position, as shown in FIGS. 14 and 14a, the overcenter spring 92 and leaf spring 42, respectively, urge access door 90 and cover 40 to snap into their respective closed positions.

When cover 40 is in the closed position, leaf spring 42 is in a straight, undeflected configuration as shown in FIG. 10. When cover 40 is in any position away from the closed position, cam surfaces 58 of arms 56 deflect leaf spring 42 as shown in FIGS. 11–14. Thus, leaf spring 42 includes a cover-driven portion 43 that engages arms 56, an anchor portion 45 that is retained in slot 68 between interior wall 69 and cylindrical side wall 50 of outer shell 32, and a bend or hinge portion 47 interconnecting portions 43, 45 as shown in FIGS. 12a and 14a. Deflection of leaf spring 42 by arms 56 inherently creates internal stresses in leaf spring 42 which act to return leaf spring 42 back to its undeflected configuration. Thus, cover-driven portion 43 of leaf spring 42 exerts a force on arms 56 when leaf spring 42 is deflected.

Cam surfaces 58 of arms 56 are configured so that the force exerted on arms 56 due to deflection of leaf spring 42 produces a torque on cover 40 having a tendency to rotate cover 40 either toward the closed position or toward the opened position depending upon whether cover 40 is between the transition position and the closed position or between the transition position and the opened position, respectively. For example, when the cover 40 is at a first intermediate point (shown in FIG. 13) disposed between the opened position shown in FIG. 12 and the transition position (not shown), the overcenter spring 42 in engagement with the cam surfaces 58 of the cover exerts a force 84 producing a clockwise torque 85 on cover 40 as shown in FIG. 12a to urge cover 40 toward the opened position. In contrast, when cover 40 is at a second intermediate point (shown in FIG. 11) disposed between the closed position shown in FIG. 10 and the transition position (not shown), overcenter spring 42 in engagement with cam surfaces 58 of cover 40 exerts a force 86 producing a counterclockwise torque 87 on the cover as shown in FIG. 14a to urge the cover 40 toward the closed position.

Figures 14, 14A:
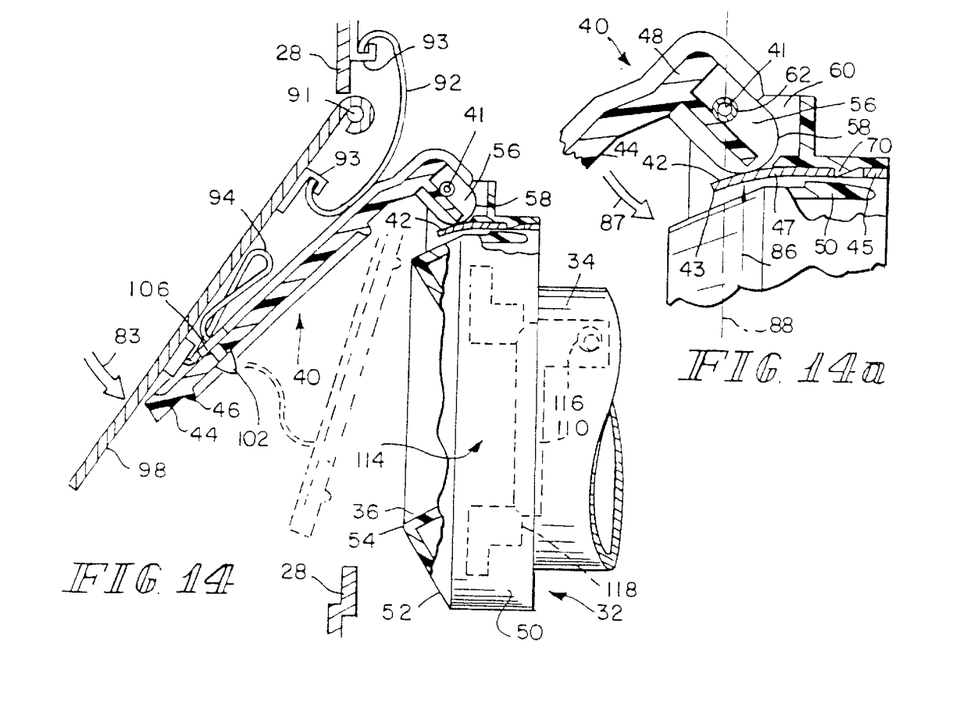
FIG. 14 is a top plan view of the closure assembly similar to FIG. 13 showing the access door moved further toward the closed position to a second partly closed position, and showing the leaf spring now acting to bias the cover away from the access door through an intermediate position (shown in phantom) and toward the closed position so as not to resist movement of the access door to its closed position.
FIG. 14a is an enlarged sectional view of a portion of FIG. 14 closure assembly showing the overcenter spring biasing the cover toward the closed position thereof.

A reference plane 88, shown in FIGS. 12a and 14a, that passes through axis 41 of cover 40 demarcates the point at which the force exerted by leaf spring 42 on cover 42 switches from producing one of torques 85, 87 to producing the other of torques 85, 87. When the force exerted by leaf spring 42 is coincident with reference plane 88, cover 40 is in the transition position.

Figures 15, 16:
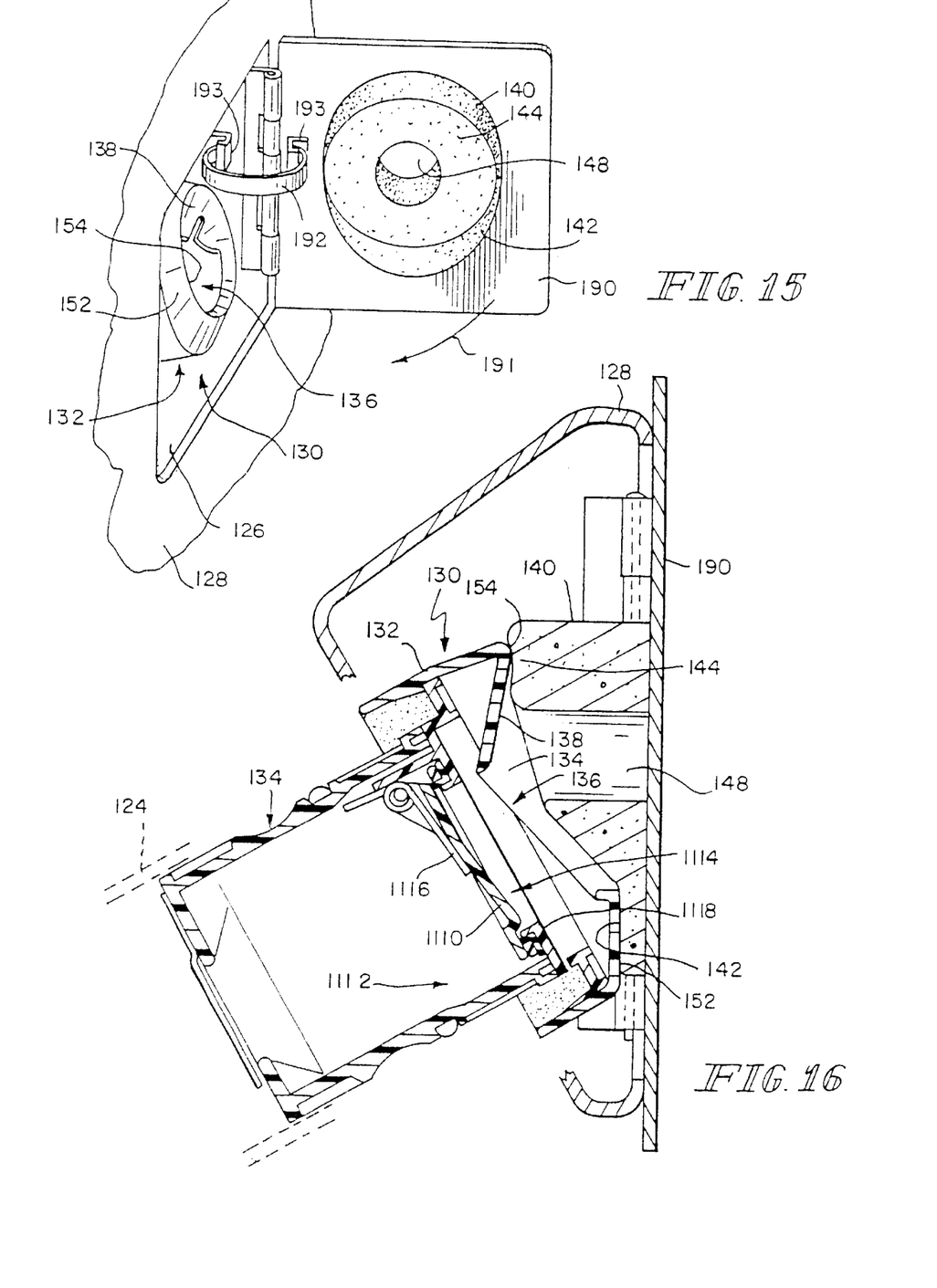
FIG. 15 is a perspective view of another embodiment of the filler neck closure assembly in accordance with the present invention showing a compressible doughnut-shaped dust cover mounted on an inner wall of a filler neck access door, which has been moved to an opened position away from the filler neck.
FIG. 16 is a sectional view of the filler neck closure assembly of FIG. 15 showing the dust cover and the access door arranged to lie in a closed position so that the dust cover engages the outer shell of the filler neck closure assembly to prevent dust and debris from entering the filler neck through the nozzle-receiving opening.

Another embodiment of the closure assembly 130 of the present invention is shown in FIGS. 15 and 16. Closure assembly 130 includes an outer shell 132 mounted on a base 134 attached to the open mouth of filler neck 124. Outer shell 132 has an inner, funnel-shaped nozzle-guiding surface 138 formed to define a nozzle-receiving opening 136. A flapper door 1110 is pivotally mounted in an interior region 1112 of base 134 for motion between first and second positions respectively closing and opening a nozzle-receiving aperture 1114. A torsion spring 1116 normally biases flapper door 1110 against a seating surface 1118 of base 134 defining the nozzle-receiving aperture 1114.

An access door 190 is pivotally mounted to a side wall 128 of the vehicle (not shown) for motion between first and second positions respectively blocking access to a filler neck access opening 126 (as shown in FIG. 16) and unblocking access to the filler neck access opening (as shown in FIG. 15). An overcenter spring 192 (shown in FIG. 15) extends between bosses 193 and biases the access door 190 toward either the fully closed position or the fully open position depending on the position of the access door. A doughnut-shaped dust cover 140 is mounted on the access door 190. The dust cover 140 has seating portions 142 and 144 adapted to respectively mate with seating surfaces 152 and 154 of the outer shell 132 when the access door 190 is closed in direction 191 to securely block the nozzle-receiving opening 136 as shown in FIG. 16.

When the access door is closed in direction 191, the overcenter spring 192 presses the dust cover 140 against the outer shell 132 to achieve a tight seal between the dust cover and the outer shell to prevent dust and debris from entering into the nozzle-receiving opening 136. An opening 148 in the dust cover 140, made from a resilient material, allows it to expand both inwardly and outwardly to further improve the tight seal between the dust cover and the outer shell 132. A suitable material for the dust cover 140 is open-cell foam pad made from neoprene material.

Figures 17, 18:
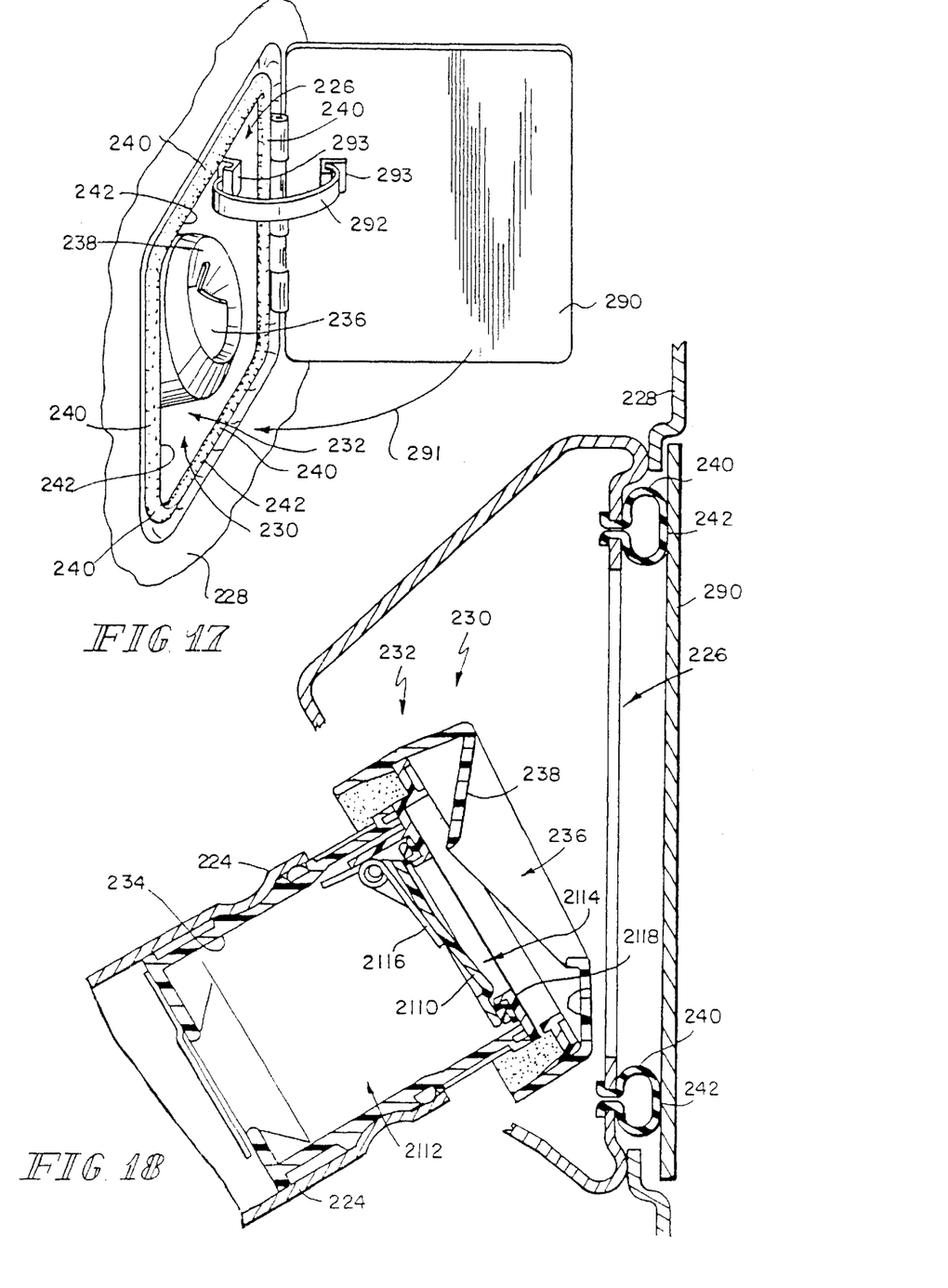
FIG. 17 is a perspective view of a yet another embodiment of the filler neck closure assembly of the present invention showing a rectangular gasket mounted on the side wall of a vehicle and positioned to lie around an opening normally closed by the access door.
FIG. 18 is a sectional view of the filler neck closure assembly of FIG. 17 showing the filler neck access door pressing against the rectangular gasket to close the filler neck access opening to prevent dust from entering the filler neck through the nozzle-receiving opening.

Yet another embodiment of the closure assembly 230 of the present invention is shown in FIGS. 17 and 18. The closure assembly 230 includes an outer shell 232 mounted on a base 234 attached to the open mouth of a filler neck 224. Outer shell 232 has an inner, funnel-shaped nozzle-guiding surface 238 formed to define a nozzle-receiving opening 236. A flapper door 2110 is pivotally mounted in an interior region 2112 of the base 234 for motion between first and second positions respectively closing and opening a nozzle-receiving aperture 2114. A torsion spring 2116 normally biases the flapper door 2110 against a seating surface 2118 of the base 134 defining the nozzle-receiving aperture 2114.

A gasket 240, made of a resilient and continuous material such as rubber or closed cell foam, is secured to a side wall 228 of the vehicle (not shown) around a filler neck access opening 226. An access door 290 is pivotally mounted to the side wall 228 for motion between first and second positions respectively blocking access to the filler neck access opening 226 (as shown in FIG. 18) and unblocking access to the filler neck access opening (as shown in FIG. 17).

An overcenter spring 292 (shown in FIG. 17) extends between bosses 293 and biases the access door 290 toward either the fully closed position or the fully open position depending on the position of the access door. When the access door 290 is closed in direction 291, the overcenter spring 292 presses the access door against a seating surface 242 of the gasket 240 to achieve a tight seal between the gasket and the access door to prevent dust and debris from entering into the nozzle-receiving opening 236.

Figures 19, 20:
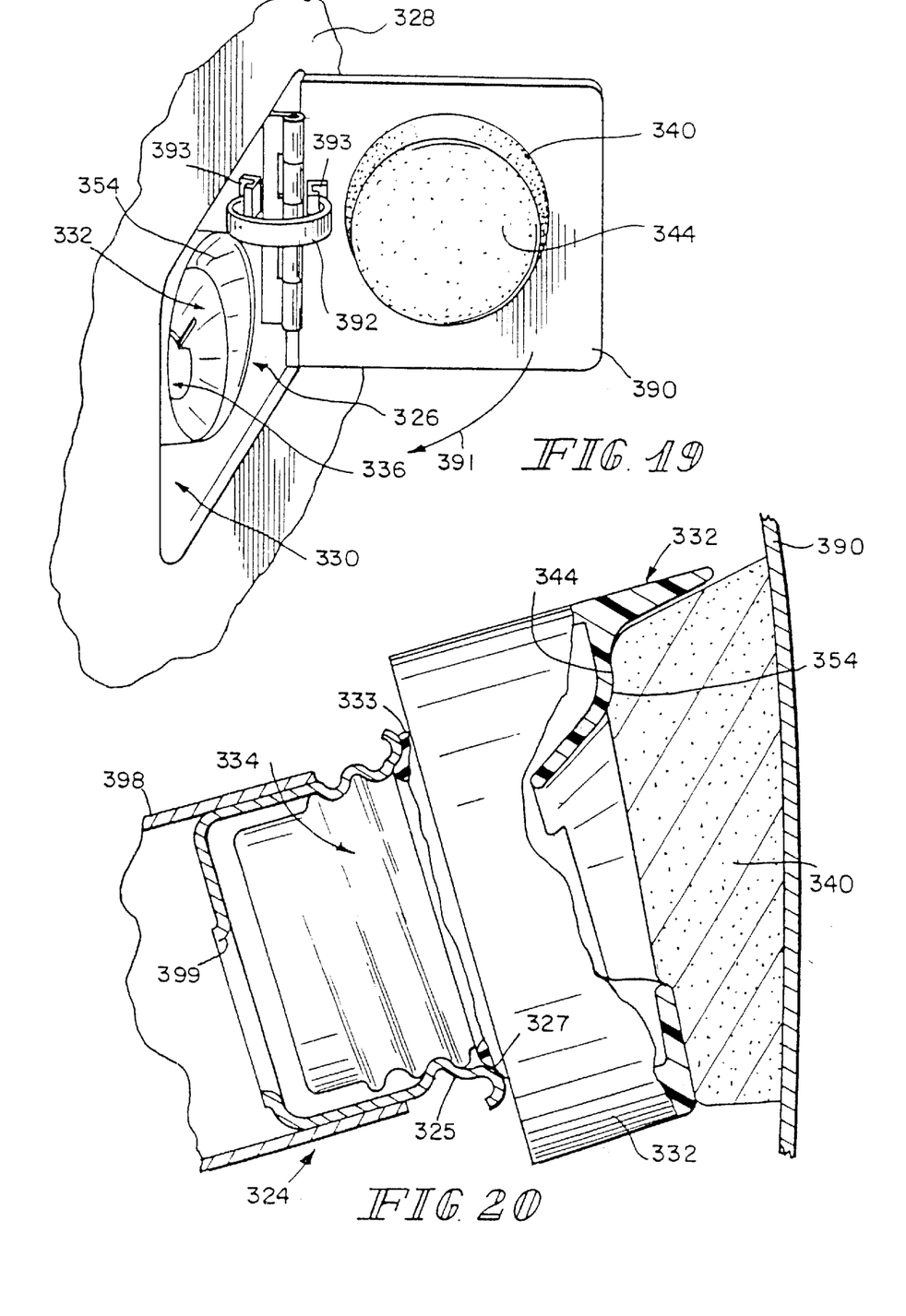
FIG. 19 is a perspective view of still another embodiment of the filler neck closure assembly of the present invention, similar to the embodiment of FIGS. 15 and 16, showing a resilient dust cover mounted on the filler neck access door and further showing the access door in an opened position away from the outer shell.
FIG. 20 is a side elevation view of the filler neck closure assembly of FIG. 19, with portions broken away, showing the access door in a closed position so that the dust cover engages an outer shell of the filler neck closure assembly to prevent dust and debris from entering the filler neck through a nozzle-receiving opening in the outer shell.

Still another embodiment of the closure assembly 330 of the present invention, similar to the embodiment of FIGS. 15 and 16, is shown in FIGS. 19 and 20. The closure assembly 330 includes an outer shell 332, a base 334 to which outer shell 332 couples, and an O-ring seal 333 mounted on base 332. Closure assembly 330 is of the type that mounts to a threaded portion 325 of a filler neck 324 so that O-ring seal 333 contacts and seals against an open mount 327 of portion 325, which also includes an unleaded discriminator opening 399 through which a pipe 398 of filler neck 324 is accessed.

An access door 390 is pivotally mounted to a side wall 328 of the vehicle (not shown) for motion between first and second positions respectively blocking access to a filler neck access opening 326 (as shown in FIG. 20) and unblocking access to the filler neck access opening (as shown in FIG. 19). An overcenter spring 392 (shown in FIG. 19) extends between bosses 393 and biases the access door 390 toward either the fully closed position or the fully open position depending on the position of the access door.

A dust cover 340, made from a resilient closed cell foam material is mounted on the access door 390. The dust cover 340 has a seating portion 344 adapted to mate with a seating surface 354 of an outer shell 332 when the access door 390 is closed in direction 391 to block the nozzle-receiving opening 336. When the access door 390 is closed in direction 391, the overcenter spring 392 presses the dust cover 340 against the outer shell 332 to achieve a tight seal between the dust cover and the outer shell to prevent dust and debris from entering into the nozzle-receiving opening 336.

Although the present invention has been described in detail with reference to certain preferred embodiments, variations and modifications exist within the scope and spirit of the present invention as described and as defined in the following claims.

What is claimed is:

1. A closure door system for a filler neck of a vehicle, the system comprising
a closure apparatus formed to include a pump nozzle-receiving opening, the closure apparatus being mounted on an open mouth of the filler neck, wherein the closure apparatus includes a flapper door movable between a first position closing a nozzle-receiving aperture and a second position opening the nozzle-receiving aperture
a first door coupled to the closure apparatus and movable between a first position covering the nozzle-receiving opening, a second position uncovering the nozzle-receiving opening, and a transition position lying between the first and second positions,
a filler neck access door coupled to the vehicle and movable between a closed position blocking access to the filler neck and an open position allowing access to the filler neck, and
a spring coupled to the closure apparatus and arranged to engage the first door, the spring being configured to bias the first door away from the access door when the first door is on a first side of the transition position and the spring being configured to bias the first door toward the access door when the first door is on a second side of the transition position.

2. The system of claim 1, wherein the closure apparatus includes an interior region in fluid communication with the nozzle-receiving aperture, the flapper door is positioned to lie in the interior region, and the first door is positioned to lie outside the interior region.

3. The system of claim 1, wherein the closure apparatus includes a seating surface, the flapper door engages the seating surface when in the respective first position, and the seating surface is positioned to lie between the flapper door and the first door.

4. The system of claim 1, wherein the closure apparatus includes first and second seating surfaces spaced apart from each other, the first door engages the first seating surface when in the respective first position, and the flapper door engages the second seating surface when in the respective first position.

5. The system of claim 4, wherein the first and second seating surfaces face in substantially opposite directions.

6. The system of claim 4, wherein the first seating surface faces toward the access door and the second seating surface faces away from the access door.

7. A closure door system for a filler neck of a vehicle, the system comprising
a closure apparatus formed to include a passage in the interior region thereof in communication with a nozzle-receiving opening therein, the closure apparatus being mounted on an open mouth of the filler neck,
a first door coupled to the vehicle and movable between a closed position blocking access to the closure apparatus and an open position allowing access to the closure apparatus,
a second door coupled to the closure apparatus and movable between a first position blocking access to the nozzle-receiving opening, a second position allowing access to the nozzle-receiving opening, and a transition position between the first and second positions,
a third door mounted in the interior region of the closure apparatus and movable between a first position closing access to the interior passage and a second position allowing access to the interior passage, and
an overcenter spring coupled to the closure apparatus and engaging the second door, the overcenter spring being configured to bias the second door toward the first position when the second door is positioned to lie on a first side of the transition position, and the overcenter spring being configured to bias the second door toward the second position when the second door is positioned to lie on a second side of the transition position.

8. The system of claim 7, wherein the closure apparatus includes first and second seating surfaces spaced apart from each other, the second door engages the first seating surface when in the respective first position, and the third door engages the second seating surface when in the respective first position.

9. The system of claim 8, wherein the first and second seating surfaces face in substantially opposite directions.

10. The system of claim 8, wherein the first seating surface faces toward the first door and the second seating surface faces away from the first door.

11. The system of claim 7, wherein closure apparatus includes an outer shell formed to include the nozzle-receiving opening and a tab extending from the outer shell and the second door is coupled to the tab for pivotable movement relative thereto about a pivot axis between the first, second, and transition positions.

12. The system of claim 11, wherein the closure apparatus further includes a pivot pin that defines the pivot axis, each of the second door and the tab includes an aperture, and the pivot pin extends through the apertures of the second door and the tab.

13. The system of claim 7, wherein the closure apparatus includes a front wall that defines the nozzle-receiving opening and a side wall that is appended to and surrounds the front wall, the side wall includes a radially inner section and a radially outer section that cooperates with the radially inner section to define a slot, and the spring lies in the slot.

14. The system of claim 13, wherein the spring engages the radially inner and outer sections.

15. The system of claim 14, wherein the spring includes a bump engaging the radially inner section and is formed to include an aperture and the radially outer section includes a post extending into the aperture of the spring.

16. The system of claim 14, wherein the second door includes a curved cam surface and the spring engages the curved cam surface.

17. A closure door system for a filler neck of a vehicle, the system comprising:
a closure apparatus including a base mounted on an open mouth of the filler neck and an outer shell mounted on the base, the base having a passage in the interior region thereof in communication with a nozzle-receiving opening formed in the outer shell,
a filler neck access door coupled to the vehicle and movable between a closed position blocking access to the nozzle receiving opening and an open position allowing access to the nozzle receiving opening,
a spring for biasing the access door toward the closed position,
a flapper door mounted in the interior region of the base and movable between a first position closing access to the interior passage and a second position allowing access to the interior passage, and a dust cover mounted on the access door for sealingly engaging the outer shell when the access door is closed, with the spring pressing the dust cover against the outer shell.

18. The system of claim 17, wherein the outer shell has a seating surface facing toward the access door, and wherein the dust cover has a seating portion adapted to sealingly engage the seating surface of the outer shell when the access door is closed.

19. The system of claim 18, wherein the dust cover has an opening therein to allow the dust cover to expand both inwardly and outwardly when the dust cover is pressed against the outer shell to ensure a tight seal between the dust cover and the outer shell.

20. The system of claim 19, wherein the base has a seating surface disposed in the interior passage thereof facing away from the access door, and wherein the flapper door and the dust cover respectively engage the seating surfaces of the base and the outer shell in the respective first positions thereof.

21. The system of claim 17, wherein the spring engages the filler neck access door so that the spring causes the filler neck access door to press the dust cover against the outer shell when the filler neck access door is in its closed position.

22. The system of claim 17, wherein the filler neck access door continuously carries the dust cover.

23. A closure door system for a filler neck of a vehicle, the system comprising:
  a closure apparatus formed to include a passage in the interior region thereof in communication with a nozzle-receiving opening formed therein, the closure apparatus being mounted on an open mouth of the filler neck,
  an access door mounted to a side wall of the vehicle and movable between a first closed position blocking access to the closure apparatus and a second open position allowing access to the closure apparatus through a filler neck access opening in the side wall,
  a spring for biasing the access door toward the closed position,
  a flapper door mounted in the interior region of the closure apparatus and movable between a first position closing access to the interior passage and a second position allowing access to the interior passage, and
  a gasket secured to the side wall around the filler neck access opening therein for sealingly engaging the access door when closed, with the spring continuously biasing the access door against the gasket when the access door is closed.

24. The system of claim 23, wherein the gasket is made from a rubber material.

25. The system of claim 23, wherein the gasket has a seating surface facing toward the access door and the closure apparatus has a seating surface facing away from the access door, and wherein the access door and the flapper door respectively engage the seating surfaces of the gasket and the closure apparatus in their respective first positions.

26. The system of claim 23, wherein the gasket contacts the access door when the access door is in its closed position and is spaced apart from the access door when the access door is in its open position.

27. The system of claim 26, wherein the side wall includes an axially outer surface facing towards the access door when the access door is in its closed position and an axially inner surface facing away from the access door when the access door is in its closed position and the gasket contacts the axially outer surface of the side wall.

28. The system of claim 27, wherein the side wall is formed to include an aperture extending from the axially outer surface to the axially inner surface and the gasket extends through the aperture.

29. A closure door system for a filler neck of a vehicle, the system comprising
  a closure apparatus formed to include a pump nozzle-receiving opening, the closure apparatus being mounted on an open mouth of the filler neck, wherein the closure apparatus includes a front wall that defines the nozzle-receiving opening and a side wall that is appended to and surrounds the front wall, the side wall includes a radially inner section and a radially outer section that cooperates with the radially inner section to define a slot, and the spring lies in the slot,
  a first door coupled to the closure apparatus and movable between a first position covering the nozzle-receiving opening, a second position uncovering the nozzle-receiving opening, and a transition position lying between the first and second positions,
  a filler neck access door coupled to the vehicle and movable between a closed position blocking access to the filler neck and an open position allowing access to the filler neck, and
  a spring coupled to the closure apparatus and arranged to engage the first door, the spring being configured to bias the first door away from the access door when the first door is on a first side of the transition position and the spring being configured to bias the first door toward the access door when the first door is on a second side of the transition position.

30. The system of claim 29, wherein the spring engages the radially inner and outer sections.

31. The system of claim 30, wherein the spring includes a bump engaging the radially inner section and is formed to include an aperture and the radially outer section includes a post extending into the aperture of the spring.

32. The system of claim 30, wherein the first door includes a curved cam surface and the spring engages the curved cam surface.

* * * * *